(12) United States Patent
Jung et al.

(10) Patent No.: US 11,858,515 B2
(45) Date of Patent: Jan. 2, 2024

(54) VEHICLE AND DRIVING CONTROL METHOD THEREOF

(71) Applicants: Hyundai Motor Company, Seoul (KR); Kia Corporation, Seoul (KR)

(72) Inventors: Chang Young Jung, Seoul (KR); Su Jin Han, Seoul (KR); Keon Chang Lee, Hwaseong-si (KR); Dong Hwi Lee, Seongnam-si (KR); Chan Il Park, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 161 days.

(21) Appl. No.: 17/501,501

(22) Filed: Oct. 14, 2021

(65) Prior Publication Data

US 2022/0111847 A1 Apr. 14, 2022

(30) Foreign Application Priority Data

Oct. 14, 2020 (KR) .................. 10-2020-0132471

(51) Int. Cl.
*B60W 30/18* (2012.01)
*B60W 30/12* (2020.01)

(52) U.S. Cl.
CPC ...... *B60W 30/18145* (2013.01); *B60W 30/12* (2013.01); *B60W 2530/201* (2020.02)

(58) Field of Classification Search
CPC .......... B60W 30/18145; B60W 30/12; B60W 2530/201
See application file for complete search history.

(56) References Cited

U.S. PATENT DOCUMENTS 10,259,458 B2 4/2019 Yoo et al.
2017/0247032 A1* 8/2017 Lee .................. B62D 15/021

FOREIGN PATENT DOCUMENTS

| CN | 111267837 A | 6/2020 |
| KR | 101795250 B1 | 11/2017 |
| WO | 2012042358 A2 | 4/2012 |

OTHER PUBLICATIONS

Hoy Stevens, Offtracking Calculation Charts for Trailer Combinations, 1965, Office of Research and Development, Bureau of Public Roads, pp. 6-7 (Year: 1965).*
European Patent Office, Extended European Search Report issued in Application No. EP 21202560.5, dated Mar. 16, 2022, 8 pages.

* cited by examiner

*Primary Examiner* — Nicholas Kiswanto
*Assistant Examiner* — Jamal A Shah
(74) *Attorney, Agent, or Firm* — Slater Matsil, LLP

(57) ABSTRACT

An embodiment driving control method includes determining whether a turning section is present ahead along a driving route of a host vehicle, determining a first turning radius with respect to a center of the host vehicle in response to determining that the turning section is present, determining, based on the first turning radius, a second turning radius required to prevent the host vehicle from deviating from a lane to an inside in a turning direction, determining a third turning radius with respect to an inner rear wheel in consideration of an overall width of the host vehicle, and controlling the host vehicle to travel along the driving route or to travel along a corrected route generated by correcting the driving route based on relative sizes of the second turning radius and the third turning radius.

20 Claims, 7 Drawing Sheets

VEHICLE AND DRIVING CONTROL METHOD THEREOF

CROSS-REFERENCE TO RELATED APPLICATIONS

This application claims the benefit of Korean Patent Application No. 10-2020-0132471, filed on Oct. 14, 2020, which application is hereby incorporated herein by reference.

TECHNICAL FIELD

The present invention relates to a vehicle and a driving control method thereof.

BACKGROUND

Recently, methods of controlling driving of autonomous vehicles based on a high-definition map have been actively developed. However, conventional methods of controlling autonomous vehicles are implemented based on the size of the body of a general passenger car. Therefore, the characteristics of commercial vehicles such as trucks or buses, which have a relatively long overall length, are not considered when generating a driving route based on a high-definition map.

In the case of turning left or right along a route having a sharp curve, a commercial vehicle requires more turning space than a passenger car. Therefore, if a commercial vehicle is controlled to follow a driving route generated according to the conventional method, a problem may occur in which a portion of the commercial vehicle deviates from the driving lane and collides with another vehicle or a curb, which forms a boundary of the road.

SUMMARY

The present invention relates to a vehicle and a driving control method thereof. Particular embodiments relate to a vehicle and a driving control method thereof enabling stable turning of a vehicle in consideration of the size of the vehicle body.

Accordingly, embodiments of the present invention are directed to a vehicle and a driving control method thereof that substantially obviate one or more problems due to limitations and disadvantages of the related art.

An embodiment of the present invention provides a vehicle and a driving control method thereof capable of generating a driving route, along which a vehicle having a relatively long overall length, such as a commercial vehicle, is capable of stably turning.

In particular, an embodiment of the present invention provides a vehicle and a driving control method thereof capable of predicting a collision, which may occur when turning along a route generated based on a high-definition map, and of preventing a collision when a collision is predicted to occur.

However, the embodiments of the present invention are not limited to the above-mentioned embodiment, and other embodiments not mentioned herein will be clearly understood by those skilled in the art from the following description.

A driving control method according to an embodiment of the present invention may include determining whether a turning section is present ahead along a driving route, determining a first turning radius with respect to the center of a host vehicle upon determining that a turning section is present, determining, based on the first turning radius, a second turning radius required to prevent the host vehicle from deviating from a lane to the inside in a turning direction, determining a third turning radius with respect to an inner rear wheel in consideration of the overall width of the host vehicle, and controlling the host vehicle to travel along the driving route or to travel along a corrected route generated by correcting the driving route depending on the relative sizes of the second turning radius and the third turning radius.

In addition, a driving control apparatus according to an embodiment of the present invention may include an information acquisition unit configured to acquire information about a driving environment, a route generator configured to determine whether a turning section is present ahead along a driving route based on the acquired information about the driving environment, to determine a first turning radius with respect to the center of a host vehicle upon determining that a turning section is present, to determine, based on the first turning radius, a second turning radius required to prevent the host vehicle from deviating from a lane to the inside in a turning direction, to determine a third turning radius with respect to an inner rear wheel in consideration of the overall width of the host vehicle, and to correct the driving route according to the relative sizes of the second turning radius and the third turning radius, and a driving controller configured to control the host vehicle to travel along the driving route or to travel along a corrected route generated by correcting the driving route depending on determination by the route generator.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF ILLUSTRATIVE EMBODIMENTS

Figure 1:
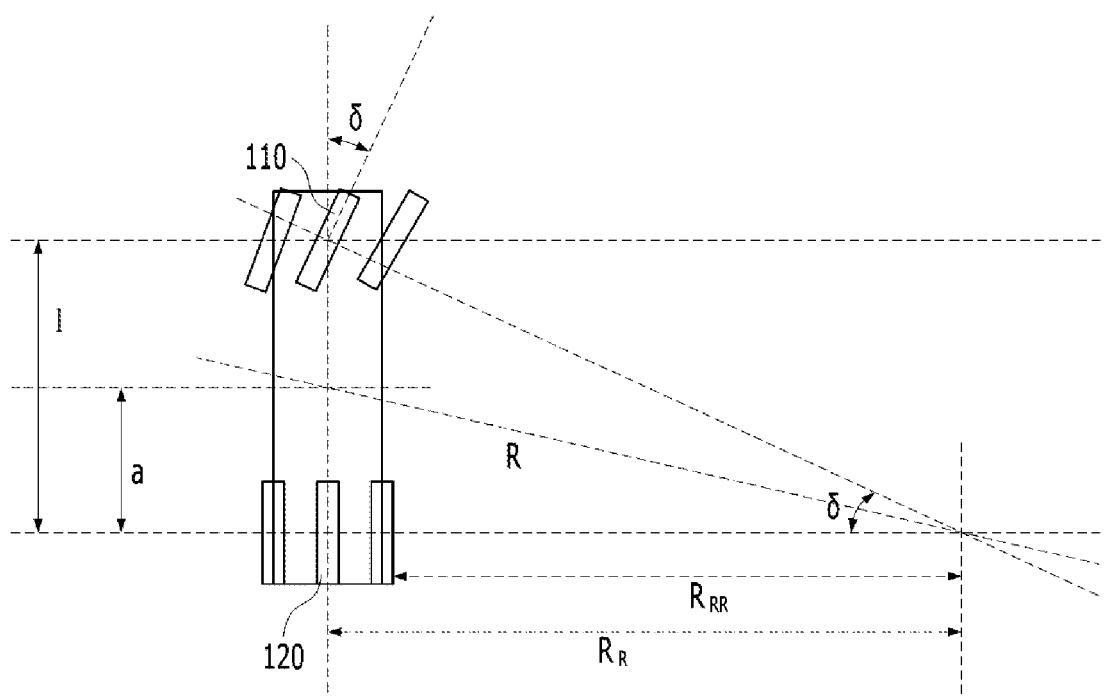
FIG. 1 is a diagram for explaining the turning radius of a vehicle.

Hereinafter, embodiments of the present invention will be described in detail with reference to the accompanying drawings so that those skilled in the art may easily carry out the embodiments. The present invention may, however, be embodied in many different forms, and should not be construed as being limited to the embodiments set forth herein. In the drawings, parts irrelevant to the description of embodiments of the present invention will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

Before explaining a vehicle and a driving control method thereof according to embodiments of the present invention, the concept of a turning radius for turning of a vehicle, a route generation method, and problems pertaining thereto will be described.

FIG. 1 is a diagram for explaining the turning radius of a vehicle.

The turning radius modeling of a vehicle shown in FIG. 1 is based on the Ackerman front-wheel steering mechanism. A steering angle δ is an angle formed by an extension line of the center of a knuckle arm of an imaginary wheel 110 between two front wheels and an extension line of the center of a knuckle arm of an imaginary wheel 120 between two rear wheels, and a point at which the two extension lines intersect is a center of turning.

In this case, the relationship between the parallel distance $R_R$ between the center of the vehicle and the center of turning, the wheelbase 1 of the vehicle, and the steering angle S is as shown in Equation 1 below.

$$\tan(\delta) = \frac{l}{R_R}, R_R = l\cot(\delta) \qquad \text{Equation 1}$$

Based on Equation 1 above, the distance between the center of the vehicle with respect to the overall width and overall length of the vehicle and the center of turning, that is, the turning radius R, may be expressed as in Equation 2.

$$R = \sqrt{a^2 + R_R^2} \qquad \text{Equation 2}$$
$$= \sqrt{a^2 + (l\cot(\delta))^2}$$

In Equation 2, "a" represents the distance between the center of the vehicle and the rear axle. Equation 2 may be transformed into Equation 3 below.

$$\cot(\delta)^2 = \frac{R^2 - a^2}{l^2} \qquad \text{Equation 3}$$

Based on Equation 3 above, the steering angle δ may be expressed as in Equation 4 below.

$$\delta = \operatorname{atan}\left(\frac{1}{\sqrt{\frac{R^2 - a^2}{l^2}}}\right) \qquad \text{Equation 4}$$

As a result, in Equation 4, since "1" and "a" are fixed values with respect to the vehicle, if the turning radius R is known, the steering angle δ can be obtained.

Figure 2:
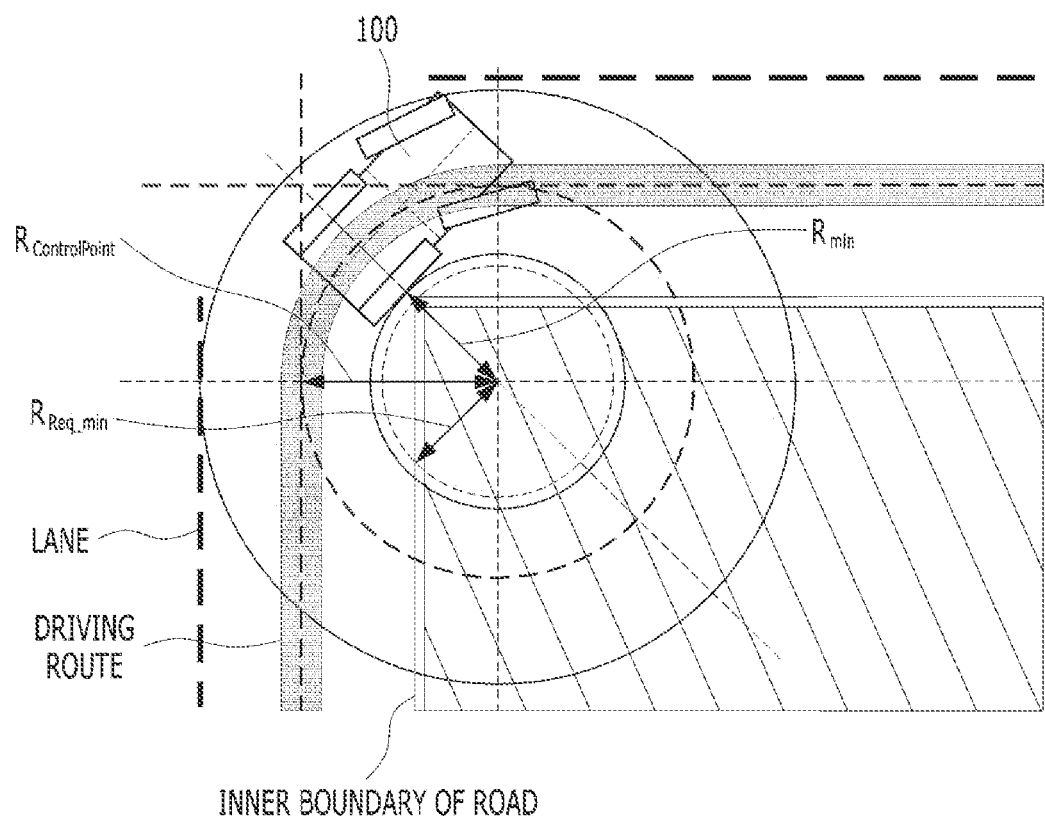
FIG. 2 is a diagram for explaining a general turning situation of a vehicle.

FIG. 2 is a diagram for explaining a general turning situation of a vehicle.

Referring to FIG. 2, when a vehicle 100 having a general size is following a driving route in an autonomous driving mode, if the driving route includes a turning route having a sharp curve, for example, a 90-degree right turn, the turning radius $R_{ControlPoint}$ of the turning section may be obtained using a waypoint of the current driving lane and a waypoint of the target driving lane after the right turn. If the turning radius is obtained, the steering angle for following the corresponding turning radius may be obtained as in Equation 4. At this time, when the general vehicle 100 turns at the corresponding steering angle, the minimum turning radius $R_{min}$ (corresponding to $R_{RR}$ in FIG. 1), which is the turning radius of the inner rear wheel, is larger than a required turning radius $R_{Req\_min}$ (i.e. $R_{min} > R_{Req\_min}$), and thus the general vehicle 100 is capable of turning without any problems. Here, the required turning radius $R_{Req\_min}$ is the minimum turning radius required for the inner rear wheel, which is located closest to the center of turning in the turning section in the driving route, to avoid deviating from the driving lane to the inside in the turning direction (i.e. to avoid movement beyond the inner boundary of the road). The required turning radius $R_{Req\_min}$ may be obtained as in Equation 5 below.

$$R_{Req\_min} = R_{ControlPoint} - \frac{\text{Road\_width}}{2} \qquad \text{Equation 5}$$

In Equation 5, "Road_width" refers to a value set in consideration of the width of the lane and the margin of the road.

However, this method is problematic in the case of commercial vehicles having a relatively long overall length, such as buses or trucks. This will be described with reference to FIG. 3.

Figure 3:
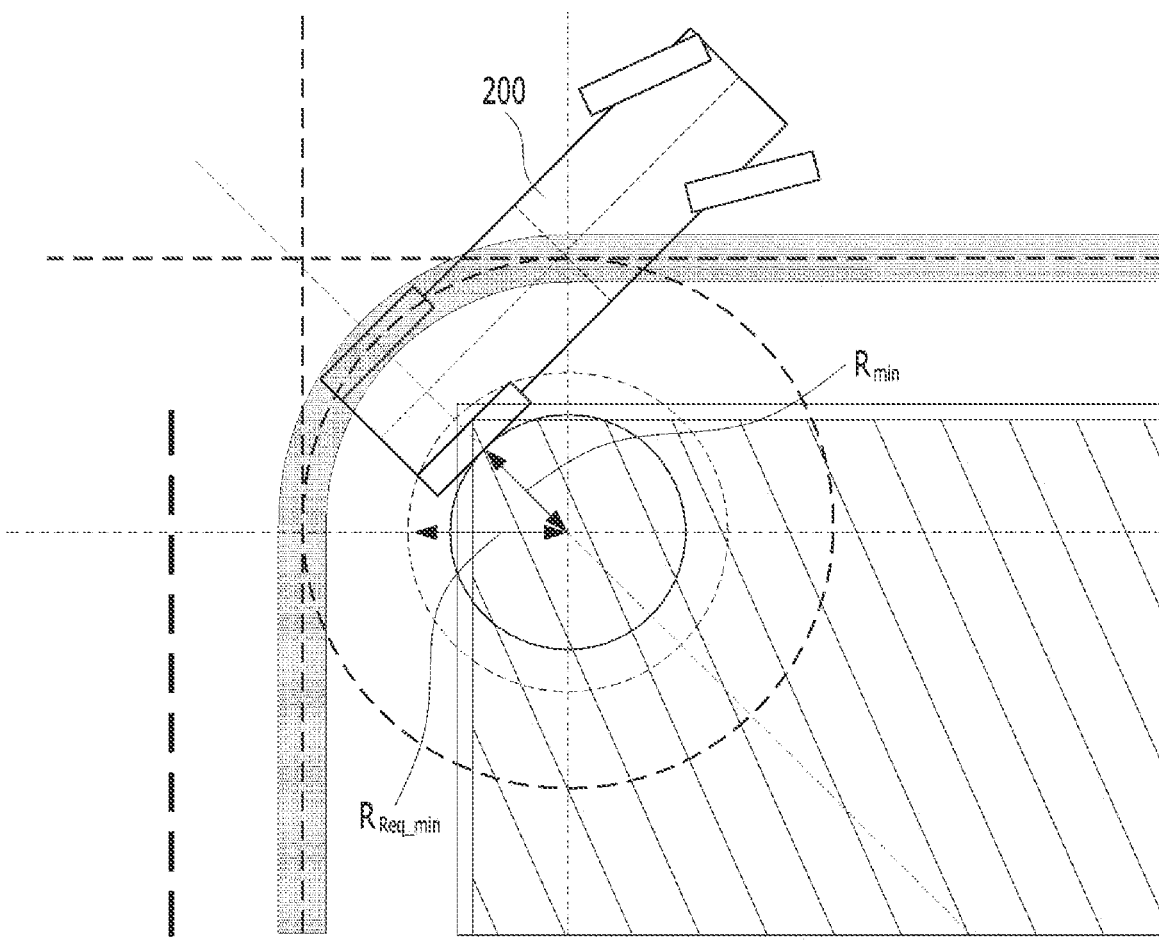
FIG. 3 is a diagram for explaining a problem that occurs when a commercial vehicle turns.

FIG. 3 is a diagram for explaining a problem that occurs when a commercial vehicle turns.

Referring to FIG. 3, when the turning radius $R_{ControlPoint}$ of the center ControlPoint of a vehicle 200 with respect to the overall length and overall width of the vehicle is obtained in the same manner as that shown in FIG. 2, the required turning radius $R_{Req\_min}$ is dependent on the shape of the road and thus is a fixed value, but the value of "a" of a vehicle having a relatively long overall length increases. Therefore, according to Equation 2, the minimum turning radius $R_{min}$ decreases for the same turning radius $R_{ControlPoint}$.

As a result, in the case of "$R_{min} < R_{Req\_min}$", the inner rear wheel of the vehicle moves beyond the inner boundary of the road.

In order to solve this problem, according to an embodiment of the present invention, whether the minimum turning radius is larger than the required turning radius is determined, and if not, the center ControlPoint of the vehicle with respect to the overall length and overall width of the vehicle is moved in the width direction of the lane so that the minimum turning radius becomes larger than the required turning radius, whereby a corrected route having a larger turning radius is generated, and the vehicle is controlled to follow the corrected route. This will be described below with reference to FIG. 4.

Figure 4:
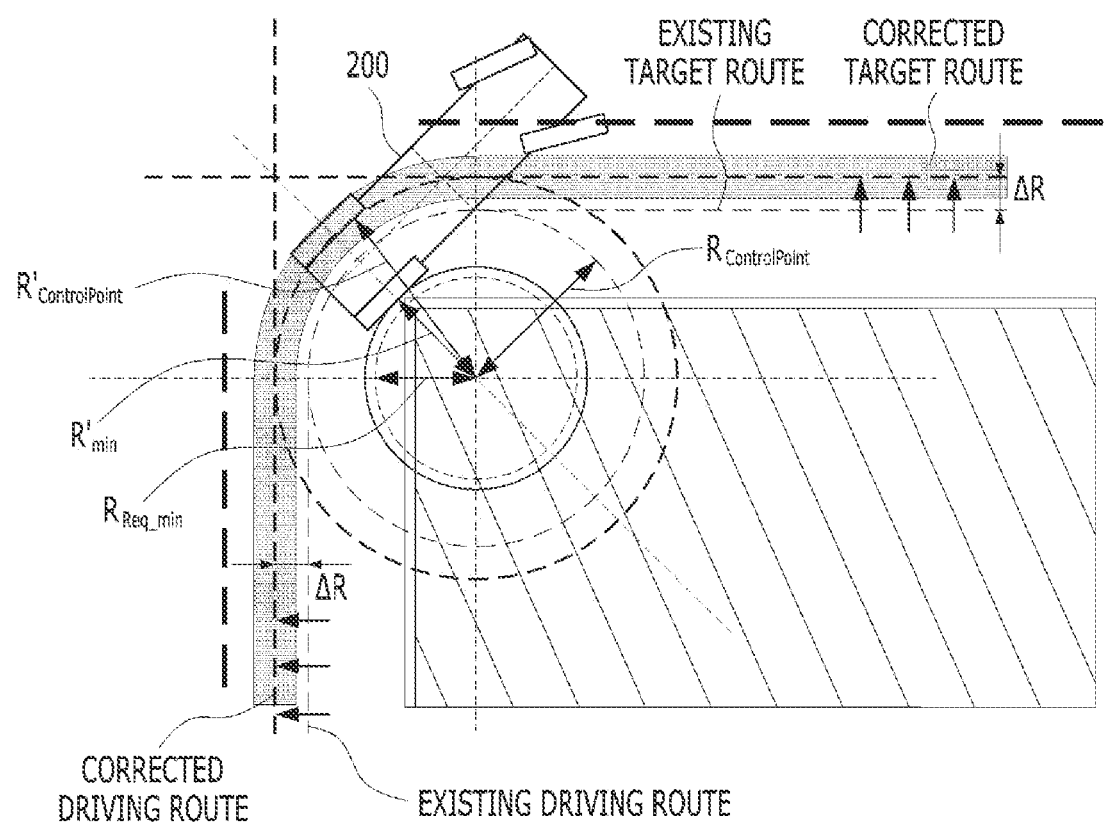
FIG. 4 is a diagram for explaining correction of a route of a vehicle according to an embodiment of the present invention.

FIG. 4 is a diagram for explaining correction of a route of a vehicle according to an embodiment of the present invention.

Referring to FIG. 4, in the case of "$R_{min}<R_{Req\_min}$" when the vehicle 200 follows an existing waypoint-based driving route, the center ControlPoint of the vehicle is moved by ΔR in the width direction of the lane toward the outside in the turning direction, whereby a corrected route having a larger turning radius $R'_{ControlPoint}$ is generated, and thus the condition "$R'_{min}>R_{Req\_min}$" is satisfied. FIG. 4 illustrates the state in which each of the driving route before turning and the target route after turning is moved by ΔR. In some embodiments, however, only the driving lane may be corrected, or only the target route may be corrected. That is, the movement of the center ControlPoint of the vehicle may be performed on at least one of the driving route or the target route.

Hereinafter, the configuration of an autonomous driving apparatus and a driving control method using the same for generating the corrected route described above with reference to FIG. 4 and for controlling the vehicle to follow the corrected route will be described with reference to FIGS. 5 to 7.

Figure 5:
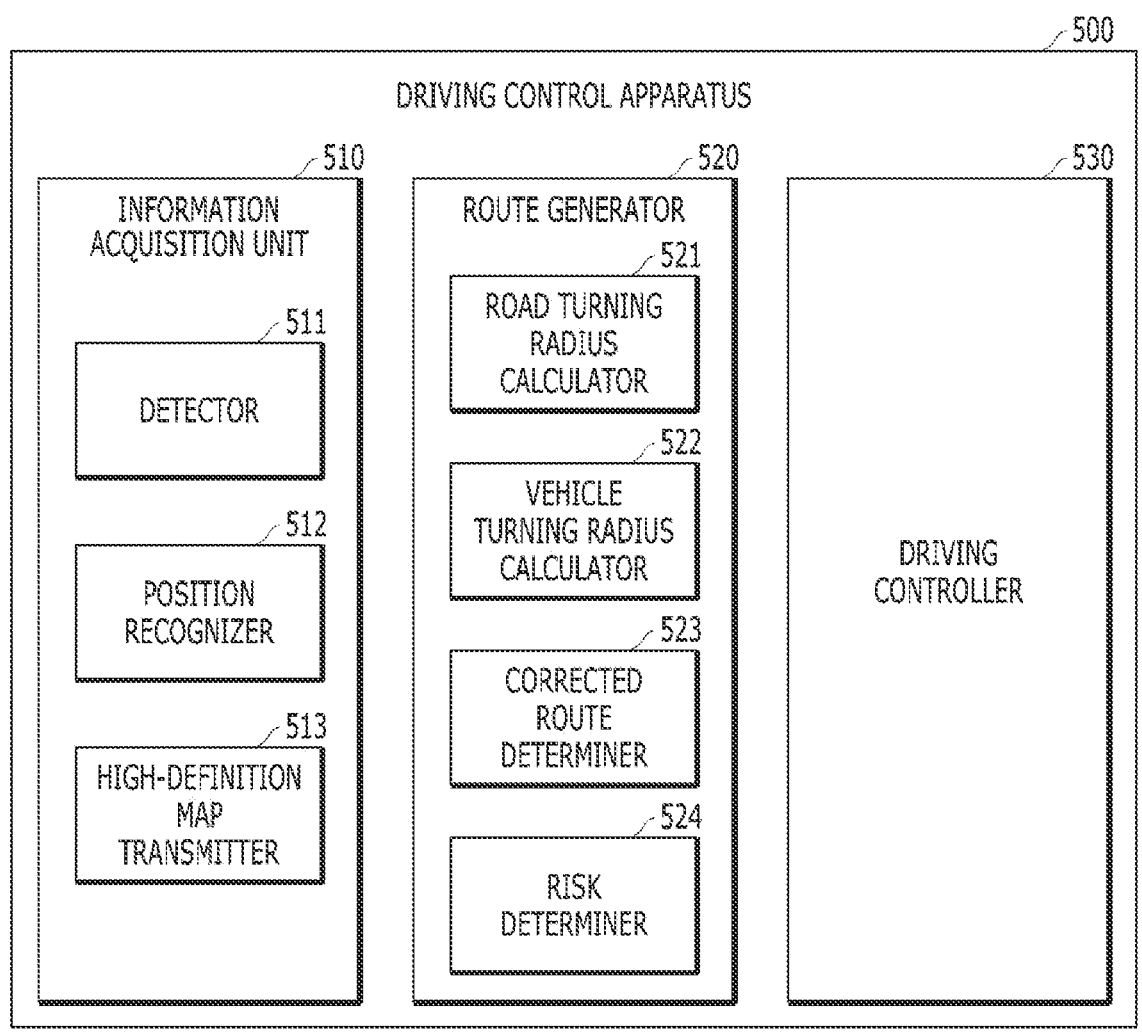
FIG. 5 is a block diagram showing an example of the configuration of a vehicle according to an embodiment of the present invention.

FIG. 5 is a block diagram showing an example of the configuration of a vehicle according to an embodiment of the present invention.

Referring to FIG. 5, the vehicle according to the embodiment may include a driving control apparatus 500, and the driving control apparatus 500 may include an information acquisition unit 510, a route generator 520, and a driving controller 530.

The information acquisition unit 510, the route generator 520, and the driving controller 530 may perform communication through a vehicle network, and the vehicle network may include any of various in-vehicle communication systems, such as controller area network (CAN), CAN with flexible data rate (CAN-FD), FlexRay, media-oriented systems transport (MOST), and time-triggered Ethernet (TI Ethernet). However, the above are given merely by way of example, and the embodiment is not limited thereto.

The information acquisition unit 510 may include a detector 511, a position recognizer 512, and a high-definition map transmitter 513.

The detector 511 may include an outer sensor for sensing information on the environment surrounding the vehicle in real time and an inner sensor for measuring information on the state of the vehicle. The outer sensor may include an image sensor and a distance measurement sensor, which are installed on at least one of the front side, the lateral side, or the rear side of the vehicle.

The image sensor may collect information on the images of the surroundings of the vehicle captured by an optical system, and may perform image processing, such as removal of noise, adjustment of image quality and saturation, and file compression, on the image information.

The distance measurement sensor may measure the distance between the vehicle and an object or the relative speed of the object, and may be implemented as a radio detection and ranging (RaDAR) sensor or a light detection and ranging (LiDAR) sensor. A radar sensor measures the distance to an object present in the vicinity of the vehicle, the heading of the object, the relative speed of the object, and the altitude of the object using electromagnetic waves, and is capable of achieving long-distance recognition and performing the functions thereof in bad weather. A LiDAR sensor radiates a laser pulse toward a region ahead of the vehicle on the road and generates point-shaped LiDAR data from a laser pulse reflected from the object. Such a LiDAR sensor has a precise resolution, and thus is mainly used to detect an object present in the vicinity of the vehicle.

The inner sensor may include a speed sensor, an acceleration sensor, and a steering angle sensor for respectively measuring the current speed, the acceleration, and the steering angle of the vehicle, and may periodically collect information on the states of various actuators.

The position recognizer 512 may serve to recognize the position of the host vehicle. To this end, the position recognizer 512 may include a global positioning system (GPS) receiver. The GPS receiver is a sensor configured to estimate the geographic position of the vehicle. The GPS receiver may receive a navigation message from a GPS satellite located far from the surface of the earth, and may collect information on the current position of the vehicle in real time based thereon.

The high-definition map transmitter 513 may have stored therein in advance a high-definition map, in which road information, such as the shape, curvature, gradient, and slope of a road, and position information corresponding to the road information are recorded, in the form of a database.

The high-definition map may include road network data composed of nodes and lane links. Here, the node refers to a point at which the attributes of a road change, like an intersection or a junction. The lane link refers to a line that linearly connects roads located between nodes, i.e. a center line of a lane. The road network data includes information about lanes, which is formed by measuring in advance the physical properties (e.g. width, curvature, gradient, and slope) of each of the lanes belonging to the roads and digitizing the same. The road network data may be automatically updated periodically through wireless communication, or may be manually updated by a user.

The route generator 520 may include a road turning radius calculator 521, a vehicle turning radius calculator 522, a corrected route determiner 523, and a risk determiner 524.

The road turning radius calculator 521 determines whether a turning section is present ahead along the driving route based on the information acquired from the information acquisition unit 510. Upon determining that a turning section is present, the road turning radius calculator 521 calculates a turning radius according to the characteristics of the road. For example, the road turning radius calculator 521 may obtain the turning radius $R_{ControlPoint}$ and the required turning radius $R_{Req\_min}$ of the turning section using the waypoint of the current lane and the waypoint of the target lane after turning. Since the method of obtaining the turning radius $R_{ControlPoint}$ and the required turning radius $R_{Req\_min}$ is the same as described above with reference to Equations 1 to 5, a duplicate description thereof will be omitted.

The vehicle turning radius calculator 522 may obtain the maximum turning radius $R_{max}$ and the minimum turning radius $R_{min}$ based on the turning radius $R_{ControlPoint}$ calculated by the road turning radius calculator 521 in consideration of the overall length of the vehicle. The minimum turning radius $R_{min}$ corresponds to $R_{RR}$ in FIG. 1, i.e. the turning radius of the inner rear wheel, and may be obtained in a manner of obtaining $R_R$ based on the steering angle obtained through the turning radius $R_{ControlPoint}$ and then subtracting half the overall width of the vehicle from $R_R$. In addition, the maximum turning radius $R_{max}$ is the distance from the center of turning to the outer front wheel, and may be obtained based on the relationship between the sum of $R_R$ and half the overall width of the vehicle ($R_R$+half the overall width) and the wheelbase 1.

The corrected route determiner 523 determines whether the minimum turning radius $R_{min}$ is larger than the required turning radius $R_{Req\_min}$. Upon determining that the minimum turning radius $R_{min}$ is not larger than the required turning radius $R_{Req\_min}$, the corrected route determiner 523 moves the center ControlPoint of the vehicle by ΔR in the width direction of the lane toward the outside in the turning direction with respect to at least one of the driving route or the target route, thereby generating a corrected route, as described above with reference to FIG. 4.

At this time, the correction amount ΔR may be obtained as in Equation 6 below.

$$\Delta R = R_{min} - R_{Req\_min} + R_{margin} \quad \text{Equation 6}$$

In Equation 6, "$R_{margin}$" is a margin value that is tuned in consideration of a control error and a vehicle movement prediction error.

As a result, the turning radius $R'_{ControlPoint}$ according to the corrected route is determined as in Equation 7 below.

$$R'_{ControlPoint} = R_{ControlPoint} + \Delta R \quad \text{Equation 7}$$

The risk determiner 524 may set a collision determination region based on the maximum turning radius and the minimum turning radius when the vehicle follows the corrected route, and may determine the likelihood of a collision in the set region based on the information acquired from the information acquisition unit 510. The concrete process of setting the collision determination region will be described later with reference to FIG. 7.

Meanwhile, the driving controller 530 may control the steering system, the power system, and the braking system of the vehicle such that the vehicle follows the route generated by the route generator 520 or the corrected route.

The driving control process for securing stable turning of a vehicle using the above-described driving control apparatus 500 will be described below with reference to FIG. 6.

Figure 6:
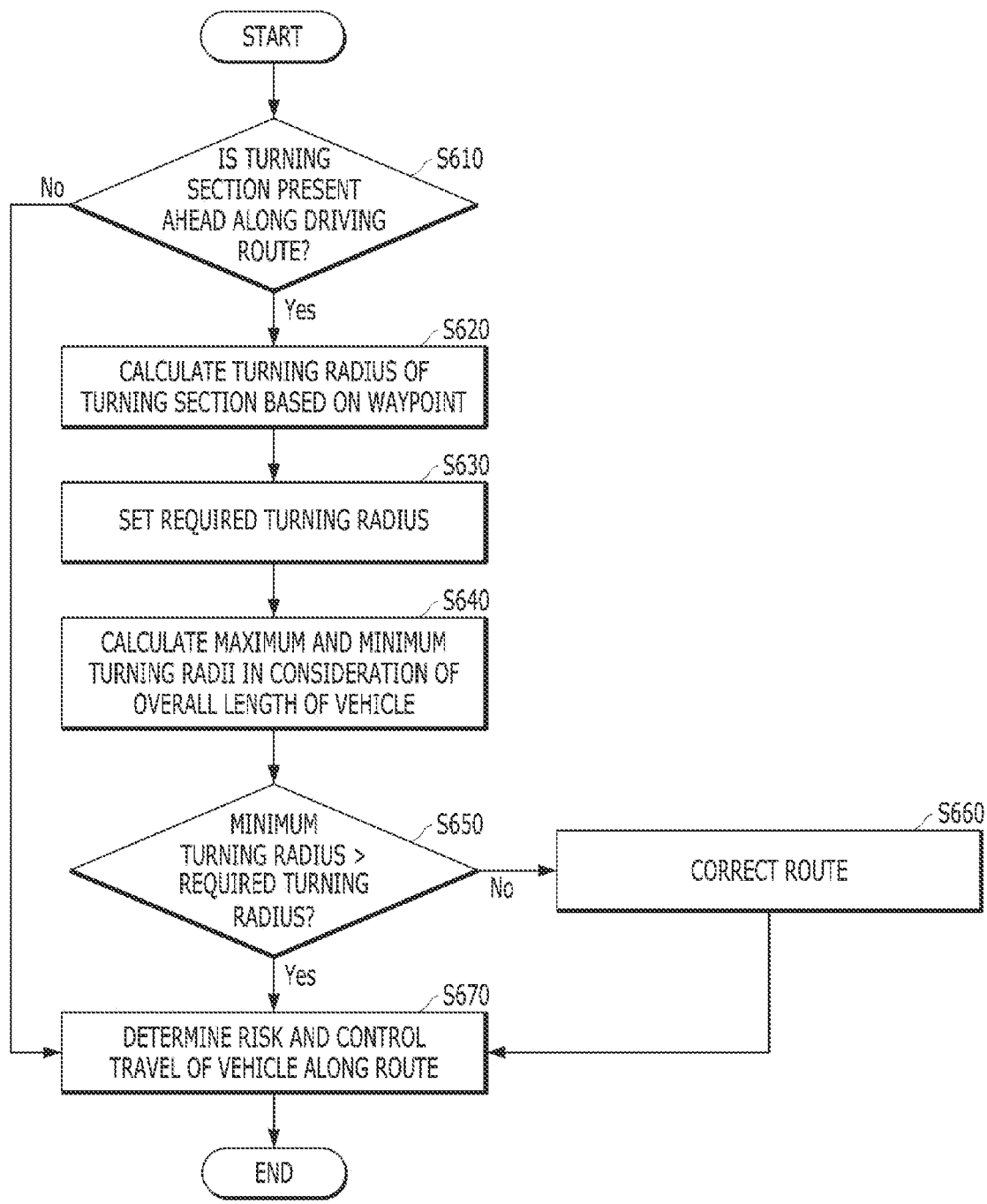
FIG. 6 is a flowchart of an example of a process of controlling driving of a vehicle according to an embodiment of the present invention.

FIG. 6 is a flowchart of an example of the process of controlling driving of a vehicle according to an embodiment of the present invention.

Referring to FIG. 6, the route generator 520 may determine whether a turning section is present ahead along the driving route based on the information acquired from the information acquisition unit 510 (S610). When a turning section is present (Yes in S610), the route generator 520 may calculate a turning radius $R_{ControlPoint}$ based on the waypoint of the existing route (S620).

In addition, the route generator 520 may set a required turning radius $R_{Req\_min}$ according to the turning radius $R_{ControlPoint}$ (S630), and may calculate a maximum turning radius $R_{max}$ and a minimum turning radius $R_{min}$ in consideration of the overall length and overall width of the vehicle (S640).

The route generator 520 may determine whether the minimum turning radius $R_{min}$ is larger than the required turning radius $R_{Req\_min}$ (S650). When the minimum turning radius $R_{min}$ is larger than the required turning radius $R_{Req\_min}$ (Yes in S650), the route generator 520 may determine the risk of the target route. Thereafter, the driving controller 530 may perform control for driving along the route (S670). In some embodiments, when the existing route is not corrected, the determination of the risk may be omitted.

On the other hand, when the minimum turning radius $R_{min}$ is not larger than the required turning radius $R_{Req\_min}$ (No in S650), the route generator 520 may correct the existing route (S660). Accordingly, the route generator 520 may determine the risk of the corrected target route. Thereafter, the driving controller 530 may perform control for driving along the route (S670).

Figure 7:
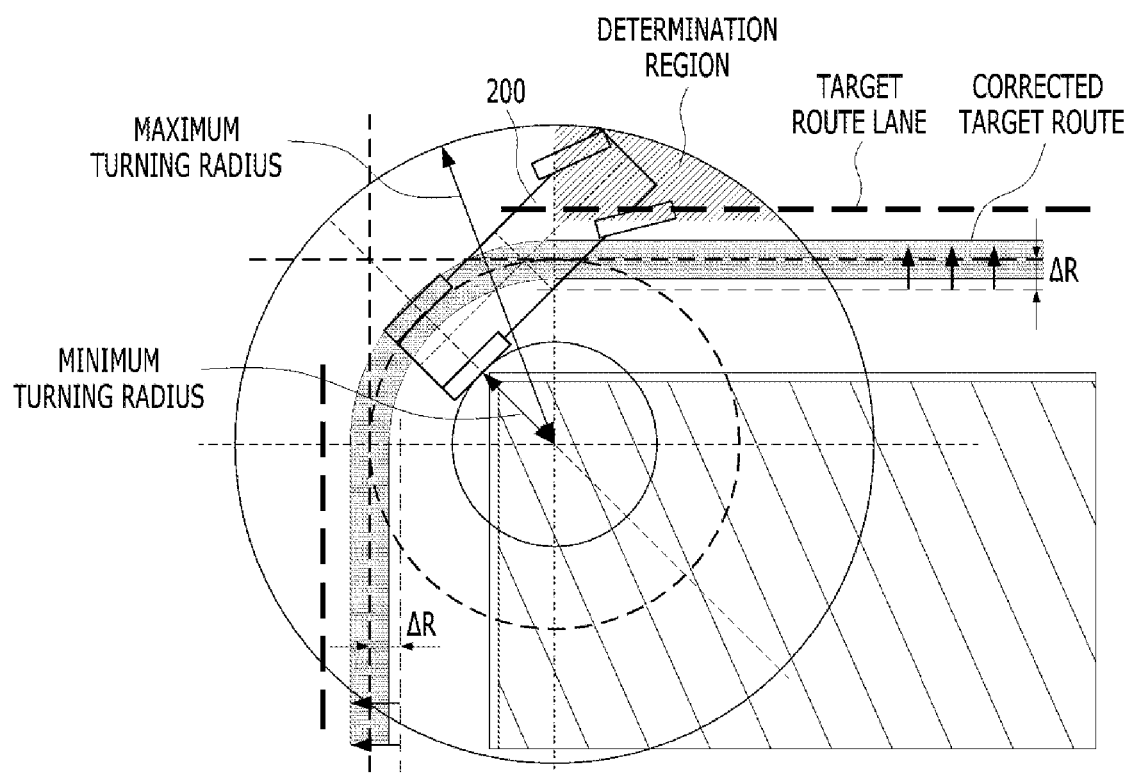
FIG. 7 is a diagram showing an example of determination of the risk of a corrected route according to an embodiment of the present invention.

FIG. 7 is a diagram showing an example of determination of the risk of a corrected route according to an embodiment of the present invention.

Referring to FIG. 7, when a commercial vehicle 200 turns along the corrected route, the maximum turning radius $R_{max}$ also increases, so a portion of the commercial vehicle 200 may deviate from the lane corresponding to the target route to a lane adjacent thereto. Therefore, the risk determiner 524 may set a determination region based on the outer lane of the corrected target route and the maximum turning radius, may determine the risk of a collision with an obstacle in the determination region, and may transmit a determination as to whether to follow the corrected target route to the driving controller 530. At this time, the maximum turning radius needs to be determined based on the turning radius $R'_{ControlPoint}$ of the corrected route, rather than the turning radius of the existing route.

According to the embodiments described above, when a vehicle having a relatively long overall length, such as a bus or a truck, is driven in an autonomous driving mode and makes a turn with a large turning radius, for example, a 90-degree right turn, the vehicle is capable of following a route without colliding with a boundary part of the road. In addition, in the process of controlling a vehicle to follow a route including a turning section at which the vehicle turns with a large turning radius, the risk of a collision with an obstacle in a region outside the target lane is determined, whereby the safety of the vehicle is ensured.

Embodiments of the present invention may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, a vehicle associated with at least one embodiment of the present invention, configured as described above, is capable of safely making a turn when following a route generated based on a high-definition map.

In particular, when a vehicle turns along a route generated based on a high-definition map, it is possible to predict the likelihood of a collision. When a collision is predicted to occur, the route is corrected through determination of the risk so as to provide a large turning space for avoiding a collision, thereby ensuring the safety of the vehicle.

However, the effects achievable through embodiments of the present invention are not limited to the above-mentioned effects, and other effects not mentioned herein will be clearly understood by those skilled in the art from the above description.

It will be apparent to those skilled in the art that various changes in form and details may be made without departing from the spirit and essential characteristics of the invention set forth herein. Accordingly, the above detailed description is not intended to be construed to limit the invention in all aspects and is to be considered by way of example. The scope of the invention should be determined by reasonable interpretation of the appended claims and all equivalent modifications made without departing from the invention should be included in the following claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A driving control method, the method comprising:
   determining whether a turning section is present ahead along a driving route of a host vehicle;
   determining a first turning radius with respect to a center of the host vehicle in response to determining that the turning section is present;
   determining, based on the first turning radius, a second turning radius required to prevent the host vehicle from deviating from a lane to an inside in a turning direction;
   determining a third turning radius with respect to an inner rear wheel in consideration of an overall width of the host vehicle; and
   controlling the host vehicle to travel along the driving route or to travel along a corrected route generated by correcting the driving route based on relative sizes of the second turning radius and the third turning radius, wherein controlling the host vehicle to travel comprises:
      controlling the host vehicle to travel along the driving route when the third turning radius is larger than the second turning radius; and
      generating the corrected route when the third turning radius is not larger than the second turning radius.

2. The method according to claim 1, wherein generating the corrected route comprises correcting the driving route such that the center of the host vehicle has a turning radius larger than the first turning radius.

3. The method according to claim 1, wherein generating the corrected route comprises moving the center of the host vehicle by a correction value in a width direction of the lane toward an outside in the turning direction with respect to the driving route before turning at the turning section or a target route after turning.

4. The method according to claim 3, wherein the correction value is obtained by adding a predetermined margin value to a value obtained by subtracting the second turning radius from the third turning radius.

5. The method according to claim 1, wherein determining the first turning radius is performed based on a waypoint constituting the driving route.

6. The method according to claim 1, wherein determining the third turning radius comprises subtracting half the overall width of the host vehicle from a parallel distance between a center of turning and the center of the host vehicle.

7. The method according to claim 1, wherein determining the second turning radius comprises subtracting half a width of the lane, determined in consideration of a margin, from the first turning radius.

8. The method according to claim 1, wherein controlling the host vehicle to travel along the corrected route comprises:
   setting a sensing region based on an outer lane of a target route after turning according to the corrected route and based on a maximum turning radius according to the corrected route; and
   determining a risk of the sensing region.

9. A non-transitory computer-readable recoding medium storing a program configured to execute the driving control method according to claim 1.

10. A driving control apparatus, the apparatus comprising:
    an information acquisition unit configured to acquire information about a driving environment;
    a route generator configured to:
       determine whether a turning section is present ahead along a driving route of a host vehicle based on the acquired information about the driving environment;
       determine a first turning radius with respect to a center of the host vehicle upon determining that a turning section is present;
       determine, based on the first turning radius, a second turning radius required to prevent the host vehicle from deviating from a lane to an inside in a turning direction;
       determine a third turning radius with respect to an inner rear wheel of the host vehicle in consideration of an overall width of the host vehicle; and
       correct the driving route according to relative sizes of the second turning radius and the third turning radius;
       generate a corrected route when the third turning radius is not larger than the second turning radius; and
    a driving controller configured to control the host vehicle to travel along the driving route or to travel along the corrected route generated by correcting the driving route based on a determination by the route generator.

11. The apparatus according to claim 10, wherein the route generator is configured to correct the driving route such that the center of the host vehicle has a turning radius larger than the first turning radius.

12. The apparatus according to claim 10, wherein the route generator is configured to move the center of the host vehicle by a correction value in a width direction of the lane toward an outside in the turning direction with respect to the driving route before turning at the turning section or a target route after turning to correct the driving route.

13. The apparatus according to claim 12, wherein the route generator is configured to obtain the correction value by adding a predetermined margin value to a value obtained by subtracting the second turning radius from the third turning radius.

14. The apparatus according to claim 10, wherein the route generator is configured to determine the first turning radius based on a waypoint constituting the driving route.

15. The apparatus according to claim 10, wherein the route generator is configured to determine the third turning radius by subtracting half the overall width of the host vehicle from a parallel distance between a center of turning and the center of the host vehicle.

16. The apparatus according to claim 10, wherein the route generator is configured to determine the second turning radius by subtracting half a width of the lane, determined in consideration of a margin, from the first turning radius.

17. The apparatus according to claim 10, wherein the route generator is configured to:
    set a sensing region based on an outer lane of a target route after turning according to the corrected route and on a maximum turning radius according to the corrected route;
    determine a risk of the sensing region; and
    transmit a determination as to whether to follow the corrected route to the driving controller.

18. A vehicle comprising:
    a vehicle body;
    a plurality of wheels coupled to the vehicle body; and
    a driving control apparatus comprising:
       an information acquisition unit configured to acquire information about a driving environment;

a route generator configured to determine whether a turning section is present ahead along a driving route of the vehicle based on the acquired information about the driving environment, determine a first turning radius with respect to a center of the vehicle upon determining that a turning section is present, determine, based on the first turning radius, a second turning radius required to prevent the vehicle from deviating from a lane to an inside in a turning direction, determine a third turning radius with respect to an inner rear wheel of the plurality of wheels in consideration of an overall width of the vehicle, correct the driving route according to relative sizes of the second turning radius and the third turning radius, and generate a corrected route when the third turning radius is not larger than the second turning radius; and a driving controller configured to control the vehicle to travel along the driving route or to travel along the corrected route generated by correcting the driving route based on a determination by the route generator.

19. The vehicle according to claim 18, wherein the route generator is configured to determine the first turning radius based on a waypoint constituting the driving route.

20. The vehicle according to claim 18, wherein the route generator is configured to determine the second turning radius by subtracting half a width of the lane, determined in consideration of a margin, from the first turning radius.

* * * * *